United States Patent
Eadie et al.

(10) Patent No.: US 10,753,330 B2
(45) Date of Patent: Aug. 25, 2020

(54) FUEL-WATER SEPARATOR SELF-DRAINING VALVE WITH RELEASE MEMBER

(71) Applicant: Caterpillar Inc., Deerfield, IL (US)

(72) Inventors: Corey C. Eadie, East Peoria, IL (US); Javier Rodriguez, Peoria, IL (US); Bryant Morris, Dunlap, IL (US); Patrick Savage, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 218 days.

(21) Appl. No.: 15/959,401

(22) Filed: Apr. 23, 2018

(65) Prior Publication Data

US 2019/0323463 A1    Oct. 24, 2019

(51) Int. Cl.
    *F02M 37/24*   (2019.01)
    *B01D 35/157*  (2006.01)
    *B01D 35/30*   (2006.01)
    *B01D 27/08*   (2006.01)

(52) U.S. Cl.
    CPC ............ *F02M 37/24* (2019.01); *B01D 27/08* (2013.01); *B01D 35/1573* (2013.01); *B01D 35/30* (2013.01)

(58) Field of Classification Search
    CPC ............ B01D 35/1573; B01D 2257/80; B01D 35/30; B01D 27/08; F02M 47/027; F02M 61/20; F02M 37/221; F02M 37/28; C02F 1/001
    See application file for complete search history.

(56) References Cited

U.S. PATENT DOCUMENTS

| | | | |
|---|---|---|---|
| 3,199,526 A * | 8/1965 | Pall | F16T 1/24 137/192 |
| 3,485,370 A | 12/1969 | Nozaki et al. | |
| 4,637,351 A | 1/1987 | Pakula | |
| 5,053,120 A | 10/1991 | Mollmann | |
| 5,371,964 A * | 12/1994 | Kubacki | G09F 15/0062 16/234 |
| 6,110,383 A | 8/2000 | Coombs et al. | |
| 7,267,769 B2 | 9/2007 | Baird | |
| 7,331,472 B2 | 2/2008 | Lisopharm | |
| 7,331,572 B2 | 2/2008 | Yamada et al. | |
| 8,409,446 B2 | 4/2013 | Abdalla | |
| 8,567,610 B2 | 10/2013 | Weindorf et al. | |
| 8,973,760 B2 | 3/2015 | Ries et al. | |
| 9,353,713 B2 | 5/2016 | Terry et al. | |

(Continued)

FOREIGN PATENT DOCUMENTS

| CA | 1188229 | 6/1985 |
|---|---|---|
| EP | 0060106 | 9/1982 |

*Primary Examiner* — Ana M Fortuna
(74) *Attorney, Agent, or Firm* — Harrity & Harrity LLP

(57) ABSTRACT

A drain for a fuel-water separator (FWS) bowl is disclosed. The drain may include a valve element configured to float in a first fluid and not in a second fluid, wherein the valve element is in a valve element chamber of the drain, wherein the valve element chamber includes an opening configured to drain the first fluid from the valve element chamber, and wherein the valve element seals the opening when the drain is in an open position and when the first fluid has been drained from the valve element chamber; and a member configured to unseal the valve element from the opening when the drain is in a closed position.

20 Claims, 2 Drawing Sheets

(56) References Cited

U.S. PATENT DOCUMENTS

| | | |
|---|---|---|
| 2002/0098137 A1 | 7/2002 | Hommeltoft |
| 2008/0257837 A1 | 10/2008 | Parr |
| 2009/0032662 A1* | 2/2009 | Parrott ............... E06C 7/14 |
| | | 248/238 |
| 2012/0279911 A1* | 11/2012 | Cofini ............ B01D 29/055 |
| | | 210/95 |
| 2013/0153487 A1* | 6/2013 | Terry ............. B01D 36/005 |
| | | 210/342 |
| 2015/0292455 A1 | 10/2015 | Metz et al. |
| 2016/0296862 A1* | 10/2016 | Libfeld ............ B01D 27/08 |
| 2018/0363783 A1* | 12/2018 | Kajio ................. F16K 1/36 |
| 2019/0030471 A1* | 1/2019 | Fayolle ........... B01D 35/153 |

\* cited by examiner

FUEL-WATER SEPARATOR SELF-DRAINING VALVE WITH RELEASE MEMBER

TECHNICAL FIELD

The present disclosure relates generally to a filter system and, more particularly, to a fuel-water separator self-draining valve with a release member.

BACKGROUND

Canister filter systems with fluid separator filters are used on equipment with internal combustion engines, such as construction equipment, mining equipment, and other types of industrial machinery. One such filter system is a fuel-water separator (FWS), which may filter water (that may be detrimental to the operation of an internal combustion engine) from fuel to be used by the internal combustion engine. A FWS may include a FWS bowl that may accumulate water that has been filtered from the fuel. In some cases, the FWS bowl may also collect some amount of fuel or contaminants (e.g., dirt, water, ash, metallic particles, other harmful debris).

An operator may need to drain the FWS bowl so that the water does not reach a level at which the water enters the internal combustion engine. To this end, many FWS bowls are provided with a drain that allows the collected water to be drained. It is important, for environmental and regulatory reasons, that fuel not escape the FWS bowl while the water is drained. Some drains use a valve element that floats in water and does not float in fuel to automatically seal the drain once the water level has decreased to a level that places the valve element in a drain opening of the drain. This may be considered an automatic draining system.

One attempt to provide an automatic draining system to drain fluid (e.g., water) from a filter is disclosed in U.S. Pat. No. 8,409,446 that issued to Abdalla on Apr. 2, 2013 ("the '446 patent"). In particular, the '446 patent discloses an automatic draining system for a filter. The automatic draining system includes a floating valve and a solenoid valve. The floating valve is housed within a compartment (e.g., a floating valve compartment) in fluid communication with a sump. Also, the floating valve has a density less than a first fluid and a density greater than a second fluid. The solenoid valve has an opening that is in fluid communication with the compartment and in fluid communication with filter media of the filter. When the first fluid reaches a certain level in the sump, the opening of the solenoid valve is opened which allows the first fluid to pass through the opening of the solenoid valve to the filter media until the floating valve seals the opening of the solenoid valve and prevents the second fluid from entering the filter media.

While the automatic draining system of the '446 patent may disclose a valve element that is in a floating position when a floating valve compartment is filled with the first fluid, allowing the first fluid to pass through the floating valve opening, and that is in a sealing position when the floating valve compartment is not filled with the first fluid, the valve element of the '446 patent may not reliably disengage from the floating valve opening after the first fluid is drained. For example, pressure from the fluid remaining in the floating valve compartment, pressure from the draining first fluid, and/or the like, may cause the valve element to remain in the floating valve opening even after the drain is closed. Thus, subsequent attempts to drain the filter may be hampered. The self-draining valve with release member of the present disclosure solves one or more of the problems set forth above and/or other problems in the art.

SUMMARY

In some aspects, the present disclosure is related to a drain for a FWS bowl, comprising a valve element configured to float in a first fluid and not in a second fluid, wherein the valve element is in a valve element chamber of the drain, wherein the valve element chamber includes an opening configured to drain the first fluid from the valve element chamber, and wherein the valve element seals the opening when the drain is in an open position and when the first fluid has been drained from the valve element chamber; and a member configured to unseal the valve element from the opening when the drain is in a closed position.

In some aspects, the present disclosure is related to a FWS bowl, comprising: a drain; and a valve element configured to float in a first fluid and not in a second fluid, wherein the valve element is in a valve element chamber of the drain, wherein the valve element chamber includes an opening configured to drain the first fluid from the valve element chamber, and wherein the valve element seals the opening when the drain is in an open position and when the first fluid has been drained from the valve element chamber; and a member configured to unseal the valve element from the opening when the drain is in a closed position.

In some aspects, the present disclosure is related to a drain provided in a FWS bowl, comprising: a valve element configured to float in a first fluid and to sink in a second fluid, wherein the valve element is in a valve element chamber of the drain, wherein the valve element chamber includes an opening configured to drain the first fluid from the valve element chamber, and wherein the valve element seals the opening when the drain is in an open position and when the first fluid has been drained from the valve element chamber; a member configured to unseal the valve element from the opening when the drain is in a closed position; and a drain element to place the drain in the open position or the closed position, wherein the member is attached to or a part of the drain element.

DETAILED DESCRIPTION

This disclosure relates to a self-draining valve for a FWS. The self-draining valve has universal applicability to any machine utilizing such a FWS. The term "machine" may refer to any machine that includes an internal combustion engine for which water is to be separated from fuel and/or that includes a filter for separating the water from the fuel.

Figure 1:
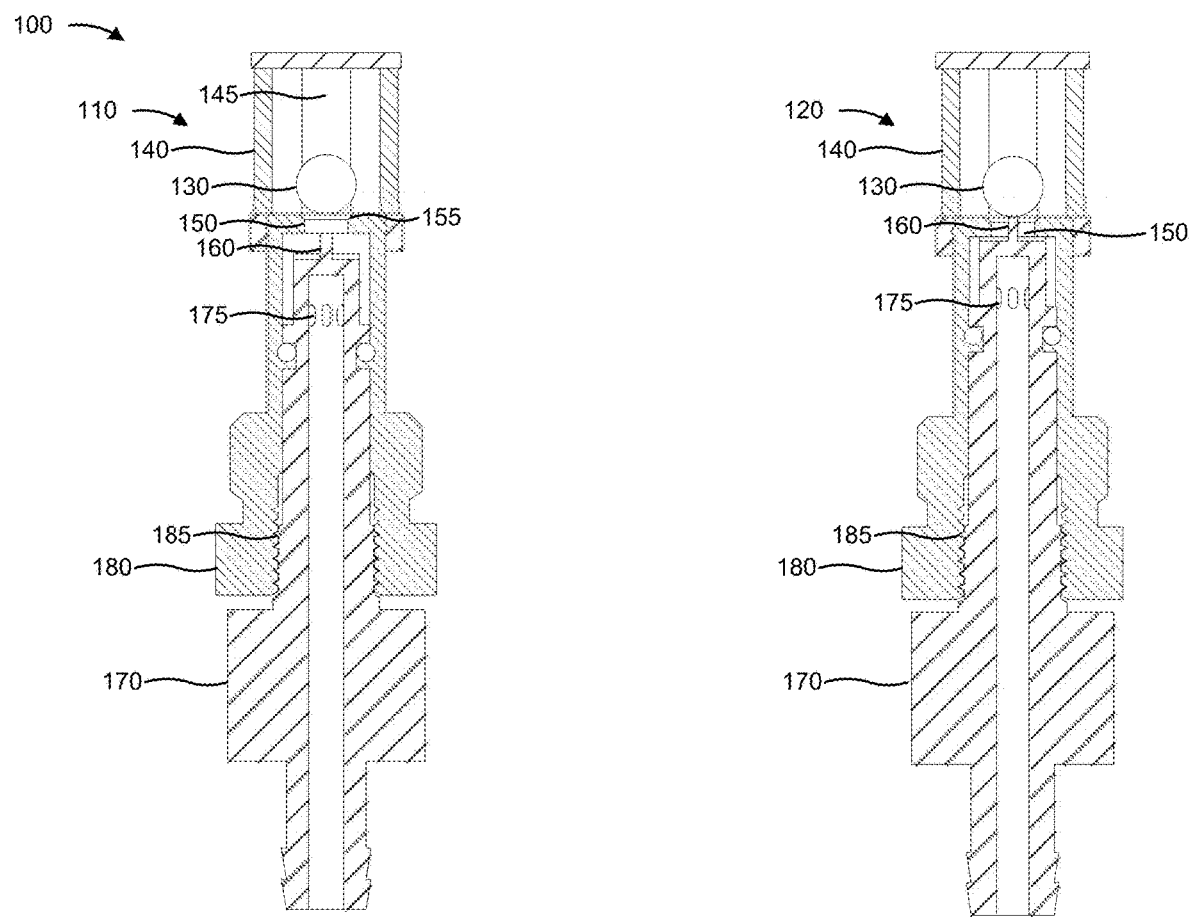
FIG. 1 is a diagram of an example drain for an FWS bowl that includes a self-draining valve with a release member.

FIG. 1 is a diagram of an example drain 100 for an FWS bowl. An FWS bowl is shown and described in more detail in connection with FIG. 2. The example drain is shown in an open position 110 and a closed position 120. As shown in FIG. 1, drain 100 may include a valve element 130. The valve element 130 may be of a density to cause the valve element 130 to float in a first fluid and not in a second fluid. In some implementations, the first fluid may be water and the second fluid may be fuel, although the implementations described herein are not so limited. For example, the first fluid may be any fluid and the second fluid may be any other fluid.

In FIG. 1, the valve element 130 is shown as being round. In some implementations, the valve element 130 may be spherical or substantially spherical. In some implementations, the valve element 130 may be cylindrical or substantially cylindrical. In some implementations, the valve element 130 may be a different shape that permits sealing of the opening 150 described below.

The valve element 130 may be enclosed within a valve element chamber 140. In some aspects, the valve element chamber 140 may have one or more windows 145. A window 145 may be of a size and shape that does not allow the valve element 130 to escape the valve element chamber 140, and may permit fluids (e.g., the first fluid and the second fluid) to reach the valve element 130 and the opening 150. In some implementations, and as shown in FIG. 1, a window 145 may be provided in a side wall of the valve element chamber 140. In some implementations (not shown), a window 145 may be provided in a top wall of the valve element chamber 140 (e.g., the wall distal from the opening 150, shown here with a top-left-to-bottom-right diagonal hatch fill).

The opening 150 may be configured to drain fluids (e.g., the first fluid) from the valve element chamber 140. The opening 150 may be of a shape that can be sealed by the valve element 130. For example, when the valve element 130 is spherical, the opening may be circular and/or may have a slanted (e.g., angled, pitched, etc.) side 155. When the valve element 130 is cylindrical (not shown), the opening may be circular and/or may have a shoulder to receive the valve element 130. The opening 150 may be in fluid communication with a drain element 170, described in more detail below. In the open position 110, the valve element 130 does not seal the opening 150. Once at least part of the first fluid (not shown) has drained from the valve element chamber 140, the valve element may move downward to the opening 150 and may seal the opening 150, thereby preventing the second fluid from draining. For example, in the open position 110, the member 160 may not touch the valve element 130.

The member 160 may be configured to unseal the valve element 130 from the opening when the drain is in the closed position 120. As can be seen, in the open position 110, the member 160 may not contact the valve element 130, even when the valve element 130 has sealed the opening 150. In the closed position 120, the member 160 may prevent the valve element 130 from sealing the opening 150 (when the valve element 130 has not sealed the opening 150), or may unseal the valve element 130 from the opening 150 (when the valve element 130 has sealed the opening 150). The member 160 may protrude from the drain element 170. In some implementations, the member 160 may be any shape or material. For example, the member 160 may be a stem, a ring, a block, and/or the like. In some implementations, the member 160 may be a part of the drain element 170. In some implementations, the member 160 may be attached to the drain element 170.

The drain element 170 may place the drain in the open position 110 or the closed position 120. For example, the drain element 170 may be connected to a drain housing 180 by a threaded connection 185. When the drain element 170 is rotated, the drain element 170 may move toward the opening 150 (to the closed position 120) or away from the opening 150 (to the open position 110). In some implementations, the drain element 170 may be connected to the drain housing 180 by a different type of connection than the threaded connection 185, such as a grooved connection, a rail connection, a sleeve connection, and/or the like. In some implementations, the drain element 170 may not be connected to the drain housing 180. The drain element 170 may be actuated using manual means or automatic means.

The drain element 170 may include channels 175. The channels 175 may allow fluid that has drained through the opening 150 to enter and drain down a shaft of the drain element 170 (shown using a white fill). For example, the fluid may drain through an opening at the bottom of the drain element 170. In some implementations, the opening of drain element 170 may be provided on a side of the drain element 170 other than the bottom of the drain element 170. In some implementations, the drain element 170 may include a single channel 175. In some implementations, the drain element may include multiple channels 175.

The drain housing 180 may at last partially enclose the drain element 170. The opening 150 may be provided in the drain housing 180. In some implementations, the valve element chamber 140 may be connected to the drain housing 180. In some implementations, the valve element chamber 140 may be part of the drain housing 180. In some implementations, the drain housing 180 may be part of the FWS bowl. For example, the drain housing 180 may be formed in the FWS bowl. In some implementations, the drain housing 180 may be separable from the FWS bowl.

As indicated above, FIG. 1 is provided as an example. Other examples are possible and may differ from what was described in connection with FIG. 1.

Figure 2:
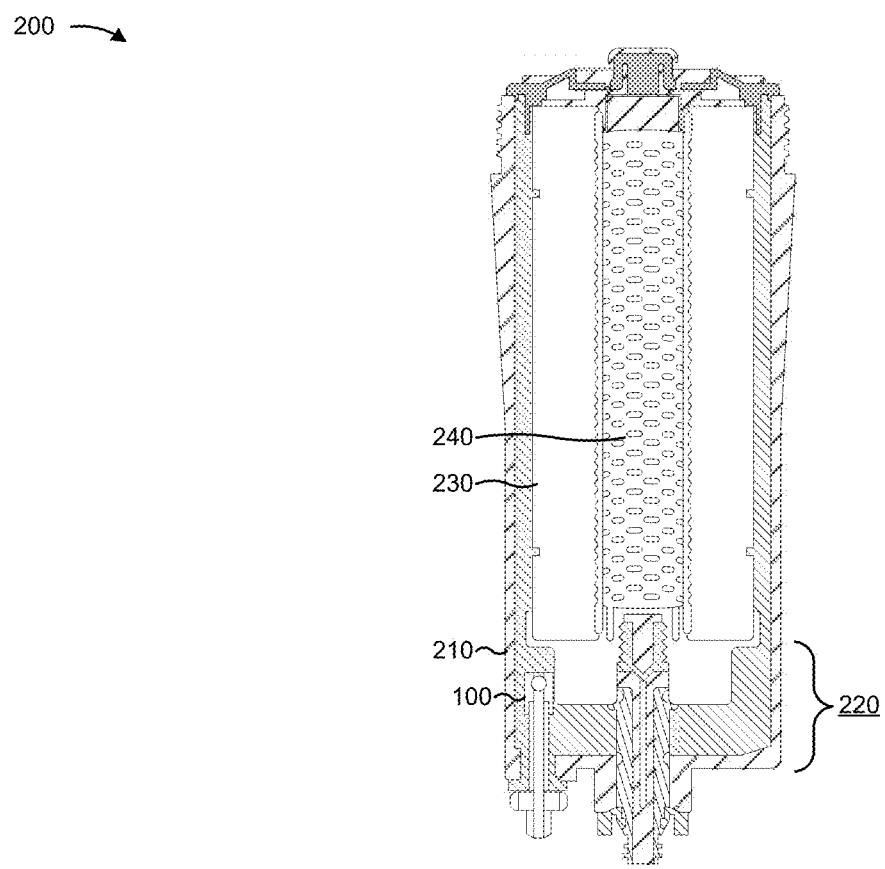
FIG. 2 is a diagram of an example FWS filter including the drain of FIG. 1.

FIG. 2 is a diagram of an example FWS filter 200 including the drain 100 of FIG. 1. The FWS filter 200 may include a filter housing 210, an FWS bowl 220, a filter medium 230, and a filter center tube 240. The filter housing 210 may be formed of any material, such as metal, plastic, fiberglass, and/or the like.

The FWS bowl 220 may collect fluids, debris, and/or the like that is filtered by the FWS filter 200. In some implementations, the FWS bowl 220 may be formed of a same material as the filter housing 210. In some implementations, the FWS bowl 220 may be formed of a different material than the filter housing 210. In some implementations, the FWS bowl 220 may be formed of an opaque material. In some implementations, the FWS bowl 220 may be formed of a transparent or translucent material.

As shown, the drain 100 may be provided in the FWS bowl 220. In some implementations, the drain housing 180 of the drain 100 may be formed as part of the FWS bowl 220. In some implementations, the drain 100 may be connectable to the FWS bowl 220. For example, the drain 100 (e.g., and/or the drain housing 180) may include a connector so that the drain 100 is removable from the FWS bowl 220. In some implementations, the drain 100 may be provided in a center of the FWS bowl 220, a side of the FWS bowl 220, and/or the like.

Fluids that are to be filtered may enter the FWS filter 200 between the filter housing 210 and the filter medium 230. The filter medium 230 may allow a first fluid (e.g., fuel) to pass into the filter center tube 240, and may block the passage of impurities and a second fluid (e.g., water) from entering the filter center tube 240. The filter center tube 240 may be configured to provide the filtered fluid (e.g., the first fluid, the fuel) for use by an internal combustion engine. For example, and as shown, the filter center tube 240 may include holes, channels, and/or the like to provide the filtered fluid for use by the internal combustion engine.

As indicated above, FIG. 2 is provided as an example. Other examples are possible and may differ from what was described in connection with FIG. 2.

INDUSTRIAL APPLICABILITY

The disclosed drain 100 with the member 160 may provide for draining of water from the FWS bowl 220 without draining fuel, and the member 160 may release the valve element 130 when the draining of water is complete. This may prevent the unintended sealing of the opening 150 (e.g., due to fluid pressure, contaminants, and/or the like) while providing for timely draining of water and preventing unwanted draining of fuel. Thus, efficiency of operation of the drain 100 may be improved in the case when the drain 100 is to be repeatedly used.

Furthermore, by causing the valve element 130 to automatically seal and unseal from the opening 150, the drain 100 enables the use of a non-transparent material for FWS bowl 220. For example, some FWS bowls 220 may be formed using a transparent material so that an operator can determine when to close the opening 150 and when the valve element 130 has unintentionally sealed the opening 150. However, a transparent material may not have ideal properties with regard to wear and durability. For example, the transparent material may be less resilient or may wear more quickly than some opaque or translucent materials. By causing the valve element 130 to automatically seal and unseal the opening 150, the need for the operator to view the drain 100 is eliminated. Thus, a non-transparent material may be used for FWS bowl 220, which may provide improved wear and resilience in comparison to a transparent material.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A drain for a fuel-water separator (FWS) bowl, comprising:
    a valve element configured to float in a first fluid and not in a second fluid,
        wherein the valve element is in a valve element chamber of the drain,
        wherein the valve element chamber includes an opening configured to drain the first fluid from the valve element chamber, and
        wherein the valve element seals the opening when the drain is in an open position and when the first fluid has been drained from the valve element chamber;
    a member configured to unseal the valve element from the opening when the drain is in a closed position and when the first fluid has been drained from the valve element chamber; and
    a drain element configured to place the drain in the open position or the closed position,
        wherein the member protrudes from the drain element, and
        wherein the drain element includes one or more channels.

2. The drain of claim 1, wherein the member extends through the opening when the drain is in the closed position.

3. The drain of claim 1, wherein the valve element is substantially spherical.

4. The drain of claim 1, wherein the valve element is substantially cylindrical.

5. The drain of claim 1, wherein the member is attached to or a part of the drain element.

6. The drain of claim 1,
    wherein the drain element is connected to a drain housing by a threaded connection, and
    wherein the drain housing includes the valve element chamber.

7. The drain of claim 1, wherein the first fluid is water and the second fluid is fuel.

8. The drain of claim 1, wherein the valve element chamber includes at least one window.

9. The drain of claim 8, wherein the at least one window is provided on a side wall of the valve element chamber.

10. The drain of claim 8, wherein the at least one window is provided on a top of the valve element chamber opposite the opening.

11. A fuel-water separator (FWS) bowl, comprising:
    a drain comprising a drain element that is configured to place the drain in an open position or a closed position,
        wherein the drain element includes one or more channels;
    a valve element configured to float in a first fluid and not in a second fluid,
        wherein the valve element is in a valve element chamber of the drain,
        wherein the valve element chamber includes an opening configured to drain the first fluid from the valve element chamber, and
        wherein the valve element seals the opening when the drain is in the open position and when the first fluid has been drained from the valve element chamber; and
    a member configured to unseal the valve element from the opening when the drain is in the closed position and when the first fluid has been drained from the valve element chamber,
        wherein the member protrudes from the drain element, and
        wherein the one or more channels allow the first fluid to enter and drain down the drain element.

12. The FWS bowl of claim 11, wherein the member extends through the opening when the drain is in the closed position.

13. The FWS bowl of claim 11, wherein the valve element is substantially spherical.

14. The FWS bowl of claim 11, wherein the valve element is substantially cylindrical.

15. The FWS bowl of claim 11, wherein the member is attached to or a part of the drain element.

16. The FWS bowl of claim 11,
wherein the drain element is connected to a drain housing by a threaded connection, and
wherein the drain housing includes the valve element chamber.

17. The FWS bowl of claim 16, wherein the valve element chamber is formed on the drain housing.

18. The FWS bowl of claim 11, wherein the FWS bowl is an opaque or substantially opaque material.

19. A drain provided in a fuel-water separator (FWS) bowl, comprising:
a valve element configured to float in a first fluid and to sink in a second fluid,
wherein the valve element is in a valve element chamber of the drain,
wherein the valve element chamber includes an opening configured to drain the first fluid from the valve element chamber, and
wherein the valve element seals the opening when the drain is in an open position and when the first fluid has been drained from the valve element chamber;
a member configured to unseal the valve element from the opening when the drain is in a closed position and when the first fluid has been drained from the valve element chamber; and
a drain element to place the drain in the open position or the closed position,
wherein the member is a part of the drain element, and
wherein the drain element includes one or more channels that allow the first fluid to enter and drain down the drain element.

20. The drain of claim 19,
wherein the drain element is at least partially enclosed by a drain housing, and
wherein the drain housing includes the valve element chamber.

* * * * *